US008385494B2

(12) United States Patent
Fan et al.

(10) Patent No.: US 8,385,494 B2
(45) Date of Patent: Feb. 26, 2013

(54) FULL RANGE OFFSET CORRECTION FOR COHERENT OPTICAL OFDM SYSTEMS

(75) Inventors: Shu-Hao Fan, Atlanta, GA (US); Jianjun Yu, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 174 days.

(21) Appl. No.: 12/841,458

(22) Filed: Jul. 22, 2010

(65) Prior Publication Data

US 2011/0075764 A1 Mar. 31, 2011

Related U.S. Application Data

(60) Provisional application No. 61/227,459, filed on Jul. 22, 2009.

(51) Int. Cl.
*H04L 7/04* (2006.01)

(52) U.S. Cl. ........................................ 375/362; 375/260
(58) Field of Classification Search .................. 375/260, 375/334–337, 354–376
See application file for complete search history.

(56) References Cited

U.S. PATENT DOCUMENTS

2004/0141457 A1* 7/2004 Seo et al. ...................... 370/203

* cited by examiner

*Primary Examiner* — Sam K Ahn
*Assistant Examiner* — Janice Tieu
(74) *Attorney, Agent, or Firm* — Joseph Kolodka

(57) ABSTRACT

A method includes synchronizing a received signal with at least two orthogonal frequency division multiplexed OFDM training signals having only in-phase values and being real in the time domain and determining a frequency offset correction from the synchronization of the received signal and training symbols responsive to a cross-correlation between said training symbols to enable estimating all possible frequency offsets for correction for enabling OFDM demodulation of said received signal.

6 Claims, 2 Drawing Sheets

FULL RANGE OFFSET CORRECTION FOR COHERENT OPTICAL OFDM SYSTEMS

CROSS-REFERENCE TO RELATED APPLICATIONS

This application claims the benefit of U.S. Provisional Application No. 61/227,459, filed on Jul. 22, 2009, entitled, "Full Range Offset Correction Technique for Coherent Optical OFDM Systems", the contents of which is hereby incorporated by reference.

BACKGROUND OF THE INVENTION

The invention relates to optical communication, and, more particularly, to a full range offset correction technique for coherent optical orthogonal frequency-division multiplexing OFDM Systems.

Orthogonal frequency division multiplexing (OFDM) is a prevailing multiplexing technique in digital mobile communication systems and starts to rise in optical communication systems. It provides flexible multiple access and multiplexing/demultiplexing ability in a low-cost and spectral efficient way. In the OFDM modulation, the data symbols are divided into multiple orthogonal narrow-bandwidth subcarriers and transmitted simultaneously. Due to its feasibility of digital dispersion compensation and narrow-bandwidth subcarriers, it can be very resistible to multi-path fading and chromatic dispersion. This makes it outstand among other modulation schemes.

However, the detection can encounter dramatic difficulty if the frequency of the local oscillator (LO) has an offset from the incoming signal, which may come from Doppler effects, channel fading, or the instability of the frequency synthesizers in transmitters or receivers. The tolerance of the frequency offset is much smaller than the subcarrier spacing, makes it difficult to implement in the environment of large frequency offset. For example, in the coherent optical OFDM (CO-OFDM) fiber communication system, the local laser, as a LO, can be shifted by a few GHz due to temperature variation. Fortunately, the detection problem caused by frequency offset can be perfectly corrected if the frequency offset amount is precisely known.

Accordingly, there is a need for a quick wide searching range frequency offset estimator coherent optical OFDM systems.

SUMMARY OF INVENTION

A method includes synchronizing a received signal with at least two orthogonal frequency division multiplexed OFDM training signals having only in-phase values and being real in the time domain and determining a frequency offset correction from the synchronization of the received signal and training symbols responsive to a cross-correlation between said training symbols to enable estimating all possible frequency offsets for correction for enabling OFDM demodulation of said received signal.

These and other advantages of the invention will be apparent to those of ordinary skill in the art by reference to the following detailed description and the accompanying drawings.

DETAILED DESCRIPTION

The present invention is directed to a method that can estimate all possible frequency offset in an OFDM system by two identical training symbols, without complicated computations such as iterative methods or matrix inversion, and without reducing the training symbol size, which may result in the system being more sensitive to noise. Without reduction of the OFDM training symbol size, the inventive method employs a special designed training symbol whose values are all real in time domain. Then a cross-correlation relationship of the two identical training symbols can estimate all possible frequency offsets for correction.

Figure 1:
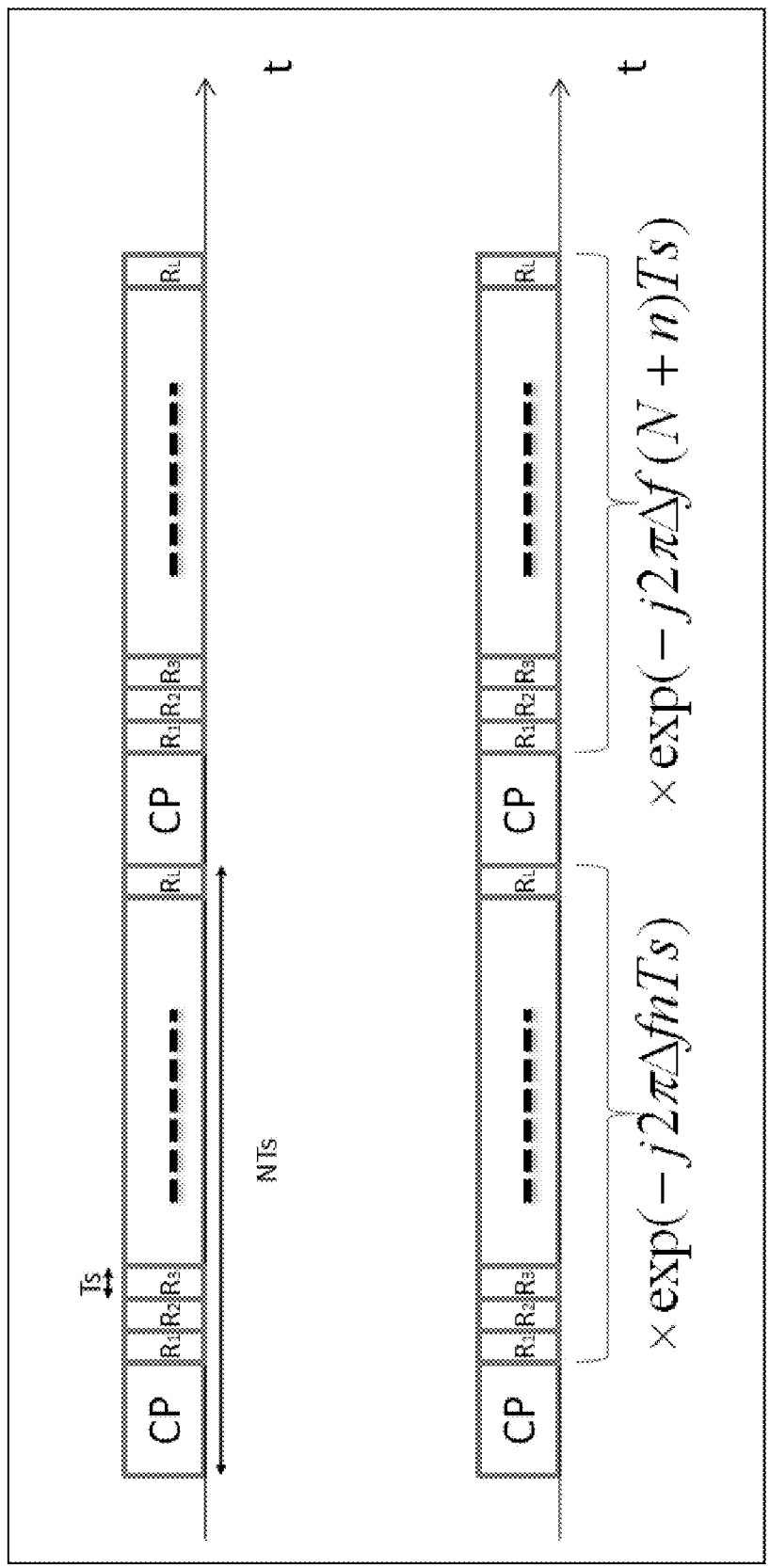
FIG. 1 is a diagram of OFDM training symbols without (upper symbol) and with (lower symbol) frequency offset $\Delta f$, presented to explain the invention.

To estimate the frequency offset two identical training symbols $[R_1\ R_2\ \ldots\ R_L]_n$ are sent sequentially, as shown in FIG. 1. If there is a frequency offset $\Delta f$ at the local oscillator, a sinusoidal wave with frequency $\Delta f$ will be multiplied to the original signal in the time domain. Let the total length of the training symbol be NTs, the total number two training symbols $r_1{}^n$ and $r_2{}^n$ will become $$r_1{}^n = [R_1 e^{-j2\pi\Delta f T s}\, R_2 e^{-j2\pi\Delta f \times 2Ts} \ldots R_L e^{-j2\pi\Delta f \times LTs}]_n$$

$$r_2{}^n = [R_1 e^{-j2\pi\Delta f(N+1)Ts}\, R_2 e^{-j2\pi\Delta f \times (N+2)Ts} \ldots R_L e^{-j2\pi\Delta f \times (N+L)Ts}]_n$$

Then the frequency offset is estimated by $$\Delta \hat{f} = -\frac{1}{2\pi NTs} \angle \sum_{k=1}^{L} (r_1^n) * (r_2^n)$$

Then, the range of the frequency estimation is limited to $-1/(NTs)$ to $1/(NTs)$, which is equivalent to few subcarrier spacings. The range can be improved by decreasing the size of an OFDM training frame N, but a smaller OFDM training size will result in less information to average out the impairments of noise, and worse equalization capability of the training symbol.

Figure 2:
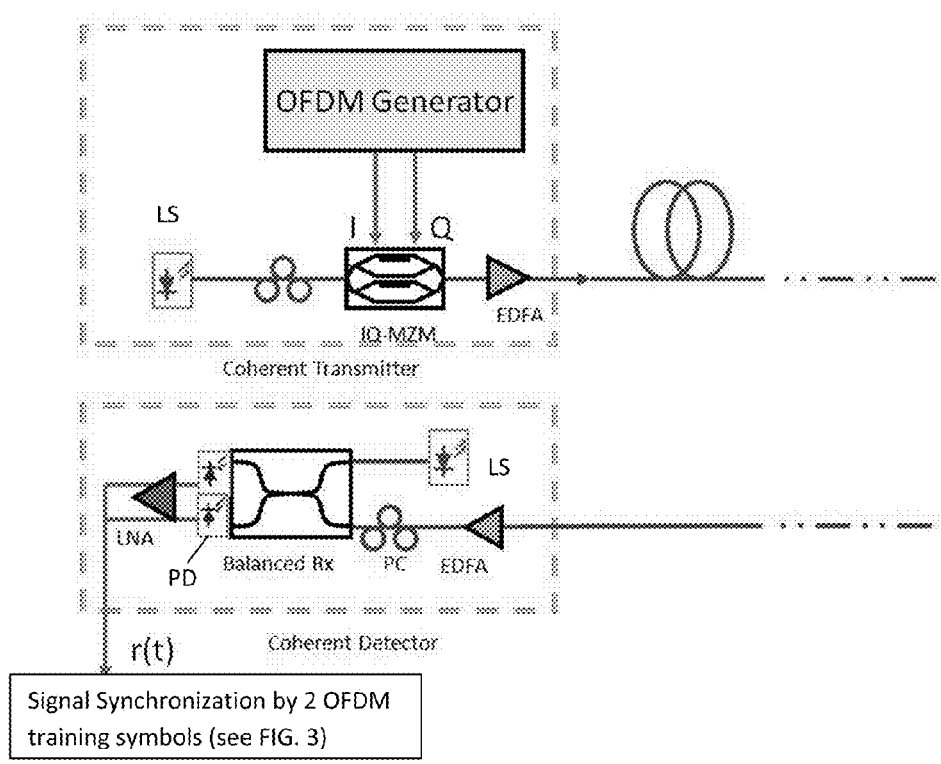
FIG. 2 is a block diagram of an exemplary OFDM communication system in accordance with the invention, with I: in-phase; Q: quadrature phase; IQ-MZM: IQ Mach-Zehnder modulator; EDFA: erbium-doped fiber amplifier; PC: polarization controller; RX: Receiver; LNA: low noise amplifier; LS: laser source; PD: photodiodes; r(t): electrical form of demodulated received signal.

Turning now to FIG. 2, there is shown an exemplary coherent optical fiber communication system with OFDM signals. The OFDM signals are first modulated onto optical carrier (as a radio frequency RF-carrier) by an in-phase/quadrature modulator IQ-MZM and then transmitted onto an optical fiber network. For the reception, a narrow-bandwidth stable laser LS is used as an RF local oscillator LO, which is mixed with the incoming signal by the balanced receiver RX and outputted though photodiodes PD. Alternative to the photodiodes, balanced optical receivers (not shown) can be used. The mixed signals are transformed to an electrical signal r(t) and then detected by the OFDM demodulator (not shown for clarity). Before performing OFDM demodulation, the received r(t) signal is first synchronized by the two OFDM training symbols. Once the incoming signal is synchronized, a the inventive frequency offset correction (FOC) is is carried out and then OFDM demodulation is performed.

Figure 3:
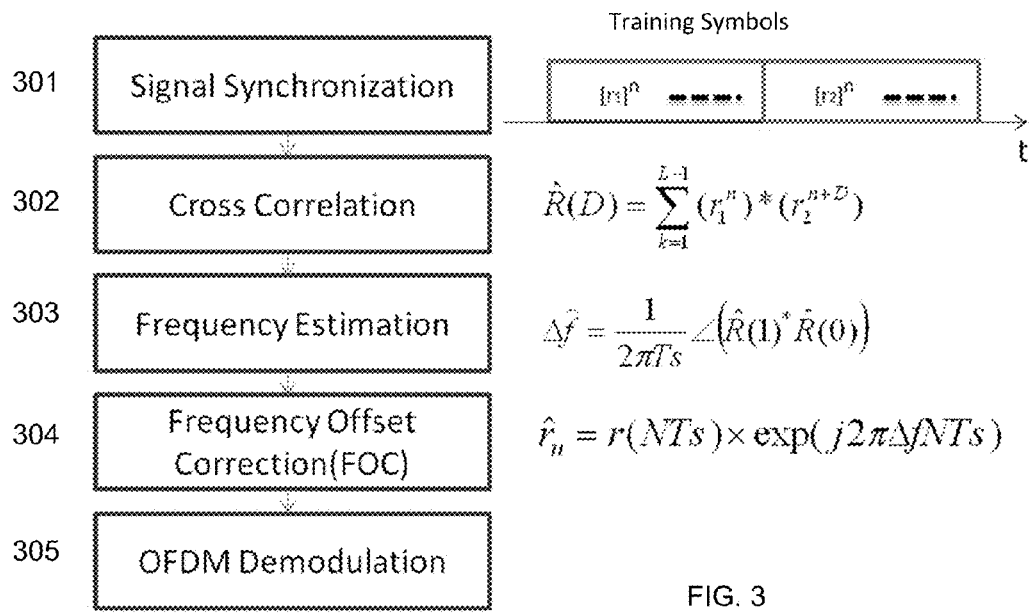
FIG. 3 is an exemplary bock diagram of OFDM frequency offset correction (FOC), in accordance with the invention.

Referring to FIG. 3, there is shown the inventive OFDM frequency offset correction (FOC) employing a cross correlation between two training symbols. The symbols $r_1''$ and $r_2''$ are the two sequential variables, i.e., training symbols. Ts is the sampling frequency and r(t) is the received signal from a coherent detector. After signal synchronization 301 with the training symbols, a cross correlation 302 is performed with a symbol sequence according to the relationship $$\hat{R}(D) = \sum_{k=1}^{L-1} (r_1^n) * (r_2^{n+D}),$$

where D is the search range. The output of the cross correlation is used to make a frequency offset $\Delta\hat{f}$ estimation 303 according to $$\Delta\hat{f} = \frac{1}{2\pi Ts} L\langle \hat{R}(1) * \hat{R}(0) \rangle.$$

The frequency offset correction $\hat{r}_n$ 304 is then $\hat{r}_n = r(NTs) \times \exp(j2\pi\Delta fNTs)$. After frequency offset correction is applied to the received signal r(t), the OFDM demodulation 305 noted with respect to FIG. 2 is carried out.

The two training symbols $r_1''$ and $r_2''$ are designed such that they originally only have in-phase values. Then after the calculation of cross-correlation, the phase shift of the received signal r(t) is removed by the complex conjugate noted in FIG. 3, so that the remaining phase of R(D) will be $2\pi\Delta f(N+D)Ts$. One may notice that when D is equal to zero, the R(0) is the same as the traditional estimator mentioned in A2. When D is set to be one, the frequency estimator can calculate frequency offset with searching range covering 0~1/Ts. Because the signal is sampled at a discrete time, any frequency over this range will just be equivalent to a certain frequency within this range with a $2\pi$ shift. Then the FOC can correct this term without any difference.

The advantage of the invention is that it can estimate all possible frequency offset in OFDM system by two identical training symbols, without complicated computation such as iterative methods or matrix inversion, and without reducing the training symbol size, which may result in the system more sensitive to noise. The searching range can be adjusted by changing the variable D in FIG. 3 without modifying training symbols, providing a more flexible solution in different applications. For example, in CO-OFDM, the frequency offset is so large that you need full searching range D=1. For indoor wireless transmission, the frequency offset is small so you can set D=N.

While an exemplary drawing and specific embodiment of the present invention has been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow and their structural and functional equivalents.

What is claimed is:

1. A method comprising the steps of:
   synchronizing a received signal with at least two orthogonal frequency division multiplexed OFDM training signals having only in-phase values and being real in the time domain; and
   determining a frequency offset correction from the synchronization of said received signal and training symbols responsive to a cross-correlation between said training symbols to enable estimating all possible frequency offsets for correction for enabling OFDM demodulation of said received signal,
   wherein said frequency offsets across all possible frequencies are directly related to correction parameters r(NTs) and $\exp(j2\pi\Delta fNTs)$, where N is a training signal time frame, Ts is a time sampling frequency, r is a variable of the training signal, and $\Delta f$ is a frequency offset.

2. The method of claim 1, wherein said step of determining said frequency offset correction comprises, after said cross correlation, removing a phase shift from said received signal by applying a complex conjugate $\exp(j2\pi\Delta fNTs)$, where N is a training signal time frame, Ts is a time sampling frequency, and $\Delta f$ is a frequency offset.

3. The method of claim 2, wherein said frequency offset correction $\hat{r}_n$ is responsive to a cross product relationship between said parameters:

$\hat{r}_n = r(NTs) \times \exp(j2\pi\Delta fNTs)$.

4. The method of claim 1, wherein said cross correlation $\hat{R}(D)$ is related to sequential variables $r_1''$ and $r_2''$ of respective said training signals $r_1'' = [R_1 e^{-j2\pi\Delta fTs} R_2 e^{-j2\pi\Delta f \times 2Ts} \ldots R_L e^{-j2\pi\Delta f \times LTs}]_n$ $r_2'' = [R_1 e^{-j2\pi\Delta f(N+1)Ts} R_2 e^{-j2\pi\Delta f \times (N+2)Ts} \ldots R_L e^{-j2\pi\Delta f \times (N+L)Ts}]_n$ where $[R_1 R_2 \ldots R_L]_n$ are sequential training symbols, N is a training signal time frame, Ts is a time sampling frequency, and $\Delta f$ is a frequency offset.

5. A method comprising the steps of:
   synchronizing a received signal with at least two orthogonal frequency division multiplexed OFDM training signals having only in-phase values and being real in the time domain; and
   determining a frequency offset correction from the synchronization of said received signal and training symbols responsive to a cross-correlation between said training symbols to enable estimating all possible frequency offsets for correction for enabling OFDM demodulation of said received signal,
   wherein said cross correlation $\hat{R}(D)$ is directly proportional to summation of sequential variables $r_1''$ and $r_2''$ of respective training signals according to the search relationship $$\hat{R}(D) = \sum_{k=1}^{L-1} (r_1^n) * (n_2^{n+D}),$$

where D sets the searching range, k represents an OFDM symbol and L is an integer counter for a range of OFDM symbols.

6. A method comprising the steps of:
   synchronizing a received signal with at least two orthogonal frequency division multiplexed OFDM training signals having only in-phase values and being real in the time domain; and
   determining a frequency offset correction from the synchronization of said received signal and training symbols responsive to a cross-correlation between said training symbols to enable estimating all possible frequency offsets for correction for enabling OFDM demodulation of said received signal, wherein said frequency offset correction is responsive to a frequency estimation $\Delta\hat{f}$ based on $$\frac{1}{2\pi Ts} L\langle \hat{R}(1) * \hat{R}(0) \rangle$$

where Ts is a time sampling frequency and $\hat{R}(1)$ and $\hat{R}(0)$ are respective first estimate training symbols of said training signals.

* * * * *